United States Patent [19]

Greenwood et al.

[11] 4,027,865

[45] June 7, 1977

[54] REINFORCED DISK SPRINGS

[75] Inventors: John H. Greenwood, Clophill, England; Emmerich Robitschek, Zurich, Switzerland

[73] Assignee: BBC Brown Boveri & Company Limited, Baden, Switzerland

[22] Filed: July 22, 1975

[21] Appl. No.: 598,008

[30] Foreign Application Priority Data

July 24, 1974 Switzerland .................... 10204/74
May 12, 1975 Switzerland ...................... 6036/75

[52] U.S. Cl. .............................. 267/148; 267/149; 267/161
[51] Int. Cl.² ........................................ F16F 13/00
[58] Field of Search .......... 267/149, 148, 152, 151, 267/161, 162, 164, 165, 35; 428/65, 105, 107, 108, 112, 113, 374; 29/173; 156/77, 181; 308/238; 277/95

[56] References Cited

UNITED STATES PATENTS

| | | | |
|---|---|---|---|
| 3,682,466 | 8/1972 | Hachette | 267/149 |
| 3,700,535 | 10/1972 | McCoy et al. | 428/113 |
| 3,784,441 | 1/1974 | Kaempen | 428/112 |
| 3,844,545 | 10/1974 | Pershin et al. | 267/152 |
| 3,892,398 | 7/1975 | Marsh | 267/63 R |

*Primary Examiner*—James B. Marbert
*Attorney, Agent, or Firm*—Oblon, Fisher, Spivak, McClellan & Maier

[57] ABSTRACT

A disk spring also known as a Belleville spring is used for applications where stiffness of the spring is an essential requirement and where the usual disk springs made of metal cannot be used or are impractical to use. The disk spring of the invention consists of a body having the shape of a conical shell of elastically deformable material, such as plastic resin, and reinforcing elements within the shell to establish directed resistance to specific deformations occurring in the disk spring when axially loaded.

In preferred embodiments of the invention, the reinforcing elements have the shape of bodies of rotation designed and positioned within the shell in configurations chosen to satisfy specific requirements of particular practical applications. The stiffness, the spring constant and the load carrying capacity which can be achieved are considerably higher than are obtainable with customary glass fiber reinforced plastic disk springs. The disk springs of the invention may be made of electrically insulating materials, and if so, they are excellantly suited for applications requiring such characteristics.

29 Claims, 11 Drawing Figures

REINFORCED DISK SPRINGS

BACKGROUND OF THE INVENTION

1. Field of the Invention

The invention concerns a reinforced disk spring, the reinforced disk spring of the invention comprising a conical shell of elastically deformable material having an upper, plane or convex surface, a lower concave surface, an outer bounding surface and an inner bore.

2. Description of the Prior Art

Disk springs, also termed Belleville springs after their inventor, are conical shells of rectangular or trapezoidal cross-section. In addition, they are often provided with an upper flat bearing surface adjacent to the bore and a lower flat bearing surface adjacent to the bounding surface through which the load is applied. The disk springs mostly used in mechanical engineering are of steel and other metals which, depending on the required spring characteristics, are employed individually or in groups, of which the latter can be stacked in "series" or in "parallel." These isotropic disk springs are described with particularity in the following literature:

a. Siegfried Gross: "Berechnung und Gestaltung von Metallfedern," 3rd edition, 1960 Springer, pages 61 – 79;

b. J. O. Almen and A. Laszlo: "The Uniform-Section Disk Spring," Transactions of the ASME, Vol. 58, 1936, pages 305 – 314.

Disk springs of electrically insulating materials are required in the construction of generators and transformers. Such springs are at present made from glass-fibre-reinforced plastics (GRP) which possess a relatively good combination of stiffness and strength. Disk springs of laminated material, of rings cut from tubes, and corrugated plates are used.

A disadvantage of the presently known GRP disk springs is that their stiffness is much lower than that of steel springs. Furthermore, with these disk springs, increased stiffness cannot be achieved by stacking them, as is the case with steel springs, because the bounding surfaces between adjacent springs cannot be permanently lubricated. For this reason, the stiffness, and hence the spring constant, for a GRP disk spring is severely limited and in many cases is insufficient. Moreover, the reinforcement provided by the fibres of known disk springs is "non-directional," i.e., the fibres offer no directed resistance against specific deformations. Instead, this reinforcement is excessive with respect to some of the forms of deformation, while it is inadequate with respect to other kinds of deformations, especially at relatively high loads. The stiffness of the spring, and hence its load capacity, therefore suffers.

SUMMARY OF THE INVENTION

An object of the invention is to avoid the above-mentioned disadvantages of known glass-fibre-reinforced disk springs and to create an anisotropic disk spring provided with reinforcement of suitable form and arrangement to present specific and sufficient resistance to the deformations occurring when loaded, and, in comparison with the known disk springs, possessing, on the one hand, much greater stiffness and hence a much higher spring constant, and on the other, a greater capacity to transfer forces, i.e., load.

The foregoing and other objects are attained in accordance with one aspect of the present invention through the provision of reinforcing elements arranged at least approximately coaxially with the spring axis embedded in at least one layer inside the conical shell, these elements presenting directed resistance to specific deformations occurring when the spring is axially loaded.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
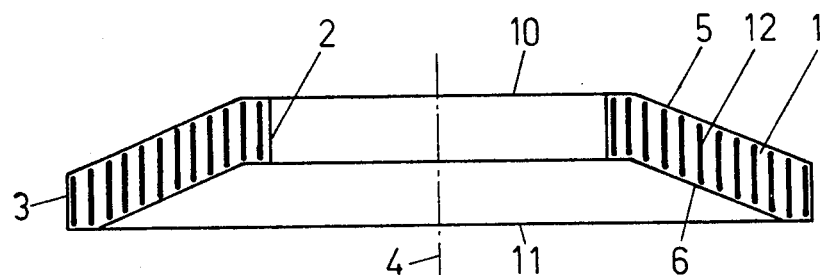
FIG. 1 shows a section through a disk spring with cylindrically shaped reinforcing elements.

Reference will now be made to the drawings wherein like reference numerals designate identical or corresponding parts throughout the several views.

Each of the anisotropic disk springs shown in FIGS. 1 to 5, 7 and 8 comprises a conical shell 1 in which are embedded reinforcing elements to increase the stiffness of the spring. The reinforcing elements fulfill the specific purpose of presenting additional resistance to the deformations caused by the load on the spring. All the springs shown have the form of bodies of rotation and conform in shape to the disk springs most commonly used in the field of mechanical engineering. The reinforcing elements, also in the form of bodies of rotation, have generatrices which make angles of between 0° and 90° with the axis of rotation 4.

The anisotropic disk spring shown in FIG. 1 comprises a conical shell 1 with bore 2, outer bounding surface 3, upper convex surface 5, lower concave surface 6, upper bearing surface 10, lower bearing surface 11 and reinforcing elements 12. The latter are embedded inside the conical shell 1 of electrically insulating material, present resistance to tensile and compressive tangential deformations and thereby increase the stiffness of the spring.

Figure 2:
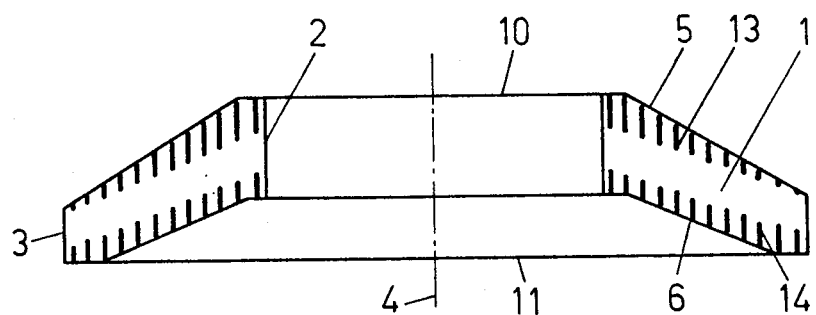
FIG. 2 shows a section through a disk spring of trapezoidal cross-section with separate tensile and compressive reinforcing elements.

In the case of the disk spring of FIG. 2, the conical shell 1 has an approximately trapezoidal cross-section inside which the compression reinforcing elements 13 and the tensile reinforcing elements 14 are arranged separately. The compression reinforcing elements 13 are at the same distance from each other as the tension reinforcing elements 14. However, since the tangential compressive deformation is greater than the tangential tensile deformation, and since moreover a reinforcing element usually has a lower compressive strength than tensile strength, the axial lengths of the reinforcing elements 13 increase from the outside inwards in accordance with the variation of the tangential compressive deformation, and hence of the stresses. To the same end, it would also be possible to use reinforcing elements of uniform axial length arranged progressively closer together from the outside inwards.

Figure 3:
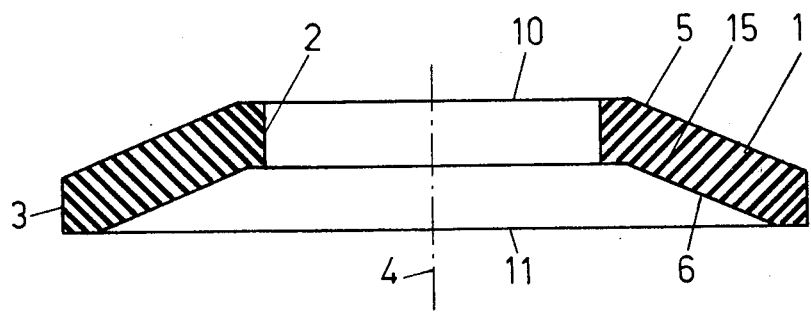
FIG. 3 shows a section through a disk spring with conically shaped reinforcing elements.

The disk spring shown in FIG. 3 has conically shaped reinforcing elements 15 which are tapered in the opposite direction to the conical shell 1. In addition, they are arranged one above the other and are distributed over the whole thickness of the conical shell 1. They provide resistance against tangential tensile and compressive deformation, on the one hand, and against axial shear deformation, on the other, The angle of taper of reinforcing elements 15 influences the extent of the resistance presented to the various forms of deformation and is selected in each specific case with regard to particular requirements.

Figure 4:
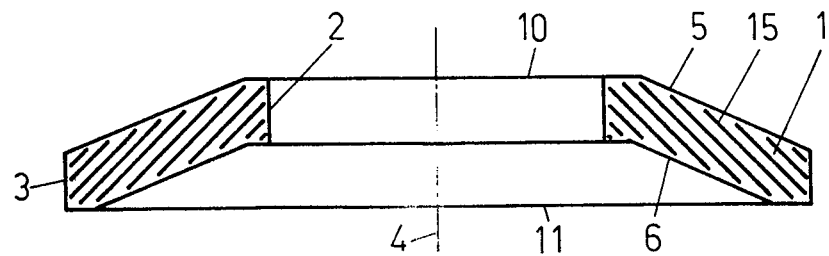
FIG. 4 shows a section through a variant of the disk spring shown in FIG. 3.

The only difference between the construction of the disk spring shown in FIG. 4 and that of FIG. 3 is that the direction of taper of the reinforcing elements 15 is the same as that of the conical shell 1, although the respective angles of taper are different. Here the reinforcing elements 15 also offer additional resistance to tensile and compressive deformation acting in the direction of the generatrix, expecially when fibres of the reinforcing elements 15 lie in the direction of the reinforcing element generatrices.

Figure 5:
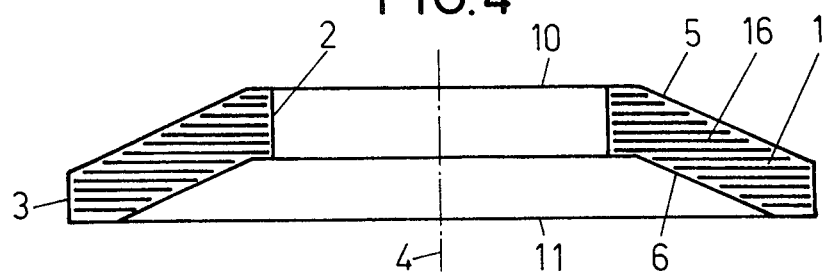
FIG. 5 shows a section through a disk spring having plane, mat-like reinforcing elements.
Figure 6:
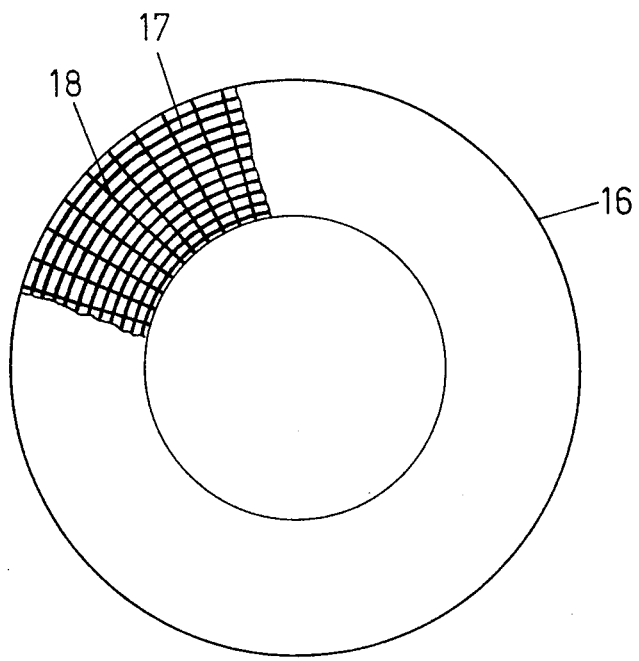
FIG. 6 is a plan view of a preferred form of a conically shaped or mat-like reinforcing element.

The reinforcing elements 16 of the disk spring shown in FIG. 5 can be considered as a limiting case of reinforcing elements 15 of the spring in FIG. 4. Here the reinforcing elements 16 are mats arranged above and parallel to one another, their "generatrices" forming an angle of 90° with the axis of rotation, and at the same time, offering resistance to tangential tensile and compressive deformation, to radial tensile and compressive deformation and to axial shear deformation. This is particularly the case if the mats have fibres 17, 18 arranged respectively in the circumferential and radial directions as shown in FIG. 6.

Figure 7:
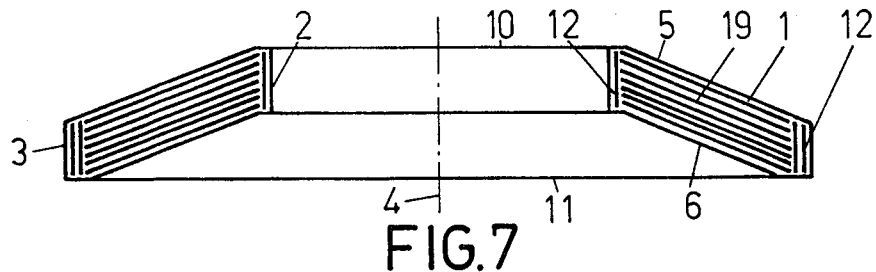
FIG. 7 shows a section through a disk spring having cylindrical and conical reinforcing elements.

In the disk spring of FIG. 7 the conically shaped reinforcing elements 19 are so arranged that their generatrices are parallel to those of the conical shell 1. This embodiment possesses relatively high resistance to tensile and compressive deformation in the direction of the generatrix and to axial shear deformation. It thus possesses great stiffness, particularly if it is provided with the cylindrical reinforcing elements 12 as shown which present additional resistance to tangential tensile and compressive deformation. If the reinforcing elements 19 are woven from fibres, their effect of improving the stiffness of the disk spring can be increased by making the fibres run in the direction of the circumference and in the direction of the generatrix.

Figure 8:
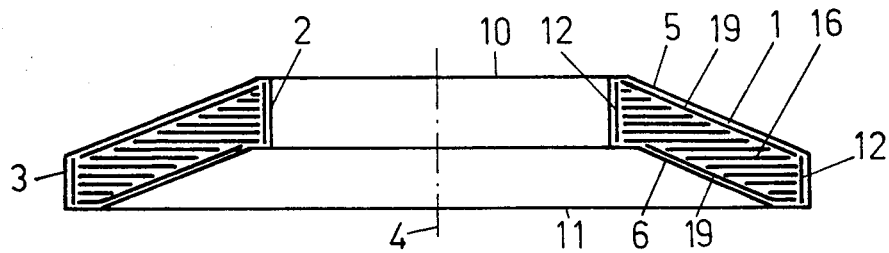
FIG. 8 shows a section through a disk spring with reinforcing elements of several different kinds.

The disk spring shown in FIG. 8 incorporates a form of reinforcement which combines the reinforcement of the springs shown in FIGS. 5 and 7. The flat mats 16 offer resistance to both radial and tangential tensile and compressive deformation. Reinforcing elements 12 and 19 present additional resistance to radial and tangential tensile and compressive deformation and increase the stiffness of the spring substantially.

When a load is applied to the spring, the deformation occurring in the conical shell and which is to be transferred to the reinforcing elements varies in magnitude between different parts of the spring. Consequently, the reinforcing elements are chosen, arranged and distributed so that they provide the strength necessary to present a specific additional resistance to the deformation occurring in the neighboring region of the conical shell. Also, they are chosen to be present in those parts of the conical shell in which deformation is greatest. Furthermore, the cross-sectional dimensions of the reinforcing elements and/or the spacing between adjacent reinforcing elements can be varied over the radial width and/or the thickness of the conical shell according to the required resistance to be provided. Also, the tension reinforcing elements can be separate from the compression reinforcing elements and can be of different materials and cross-sections. Moreover, the reinforcing elements need not necessarily be distributed over the whole radial width or axial thickness of the conical shell. They can instead be limited to a specific portion of the conical shell, for example, to the region of the greatest deformation.

To achieve maximum stiffness it is best to place the greatest possible number of reinforcing elements in the region of the conical shell adjoining the circumference. Since the deformation in this part of the conical shell is both tangential and radial, it is advisable to arrange the reinforcing elements in the region concerned so that they offer resistance to both tangential and radial deformation. Since the tangential deformation is greater than the radial, the reinforcing elements running in the circumferential direction contribute more to the increase in stiffness. The stiffening effect of the radial reinforcing elements should not be underestimated, especially since they also offer resistance to axial shear deformation.

With all the disk springs shown, the reinforcing elements can be individual, i.e., separate from each other, or combined, i.e., joined together. For example, the cylindrical or conical reinforcing elements can be continuous spirals or concentrically arranged loops while the mat-like reinforcing elements can take the form of individual mats or a composite helical sheet. In addition, extra woven material, mats or short fibres can be embedded in the conical shell if desired.

The reinforcing elements can be made, for example, in the form of foil or fibres. In the latter case, the fibres can be used individually, twisted into cords, in a woven structure or as mats. If the aim is maximum stiffness, the fibres should lie in the circumferential direction and in the direction of the genatrix.

It is also essential to ensure faultless interaction between the conical shell and the reinforcing elements since the load made to act on the disk spring is applied directly to the conical shell and is transmitted by the shell to the reinforcing elements via the common contact surfaces. A possibility must therefore be provided for forces to be transferred between the material of the conical shell and the reinforcing elements so that deformation of the shell is transmitted in full to the reinforcing elements without relative movement between the two.

In many cases the adhesive forces between the reinforcing elements and the conical shell are sufficient to ensure that both deform together. In the case of relatively high loadings, or if greater stiffness is required, these adhesive forces can be increased by giving a special form to the outer surfaces of the reinforcing elements which come in contact with the material of the conical shell, i.e., by increasing the active contact area through treating, e.g., roughening the surface. Also, an intimate bond between reinforcing elements and conical shell can be achieved by providing the reinforcing elements with hollow spaces, e.g., by means of a lattice arrangement into which the material of the shell can penetrate. This not only facilitates the transmission of deformation of the shell to the reinforcing elements, but also preserves the continuity of the shell material so that no actual planes of separation are formed between the reinforceing elements and the shell material. Thus, there occurs no weakening of the disk spring as would otherwise take place at such interfaces.

From the point of view of maximum adhesion between reinforcing element and shell material, it is desirable to embed each reinforcing element in the shell material in such a way that each individual fibre is surrounded by shell material. In this way, when the spring is loaded, the friction occurring at the interface between the reinforcing fibres and the shell material is great enough to prevent any relative movement between the fibres and the shell material and to allow deformation to be transmitted to the reinforcing element without jeopardizing adhesion, even with high loadings. Individual fibres are difficult to handle, however, and therefore a mesh-like structure of woven fibres with suitably sized hollow spaces such as shown in FIG. 6, serves the purpose much better. It should also be mentioned that, as regards suitability for an intended purpose, from the standpoint of mechanical strength, there are good and poor combinations of materials, i.e., those whose capabilities can be fully utilized, and those whose possibilities cannot be exploited.

The conical shell usually has an upper and a lower bearing surface and, in cross-section, is either rectangular, trapezoidal or of another shape appropriate to obtaining a desired force/deflection characteristic. As regards its material, the conical shell has to satisfy additional conditions essential to its proper functioning as a disk spring. In this regard, it is important to realize that the various forms of deformation which a reinforced disk spring undergoes as a result of a decrease in height are essentially the same as the forms of deformation that a non-reinforced conical shell, of the same shape and dimensions and consisting of the same shell material, undergoes as a result of the same decrease in height. In other words, when a reinforced disk spring is pressed flat, the various deformations occurring in its conical shell are essentially of the same kind and magnitude as those occurring in a non-reinforced disk spring of the same shape and dimensions, and of the same shell material, when pressed flat. The difference in the behavior of these two conical shells lies solely in the fact that a greater load is needed to produce in the conical shell of a reinforced spring the same amount of deformation as in the conical shell of a non-reinforced spring. The difference between these two loads is, of course, required to deform the reinforcing elements, i.e., to overcome the resistance presented by the reinforcement.

From this there arises an essential condition which the conical shell of a reinforced disk spring must satisfy with respect to material, shape and dimensions, namely, that a non-reinforced specimen of the same shape as the disk spring must be able to withstand without plastic deformation the maximum deformations, and hence stresses, which are anticipated on loading the reinforced disk spring. Satisfying this condition also ensures that the reinforced disk spring returns to is original shape when the load is removed. For a given shell material, this condition can be satisfied through a suitable choice of shape and dimensions of the shell, and for a given shape and given dimensions, through a suitable choice of the shell material.

If the disk spring is required to be electrically insulating, it is recommended that all its components should be made of electrically insulating materials. If the property of electrical insulation is not essential, however, the conical shell can be of one metal, and the reinforcing elements of another metal, or the conical shell can be of plastic and the reinforcing elements of metal wire.

For the applications occurring in practice, the requirements can vary widely. These requirements can relate to the shape, dimensions, material and spring constant, and hence to the load capacity of the disk spring. For each practical case there are a number of solutions, the best of which can be selected with the aid of relatively simple calculations.

Figure 9:
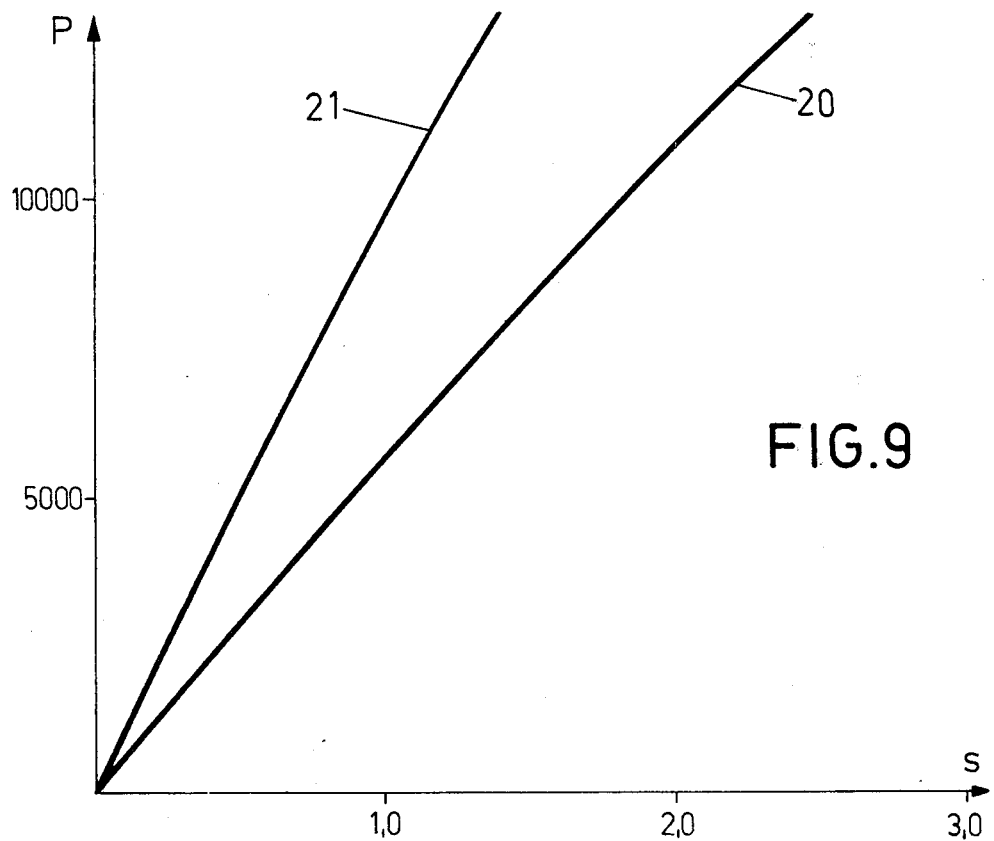
FIG. 9 is a force/spring deflection diagram for comparing a GRP disk spring of the invention with a known GRP disk spring.

The surprising result, as has been clearly shown even by initial tests with disk springs having combined tension and compression reinforcing elements, is the much greater stiffness of a disk spring according to the invention as compared with a GRP disk spring conforming to the present state of the art. The results of such a test are presented in FIG. 9 which shows a force/spring deflection diagram ($P = f(s)$ diagram) comparing disk springs tested in pairs. In this diagram, curve 20 relates to a pair of disk springs of laminated mat (epoxy resin + glass fibre) according to the present state of the art and curve 21 relates to a pair of disk springs reinforced in accordance with the invention, the conical shell being of cycloaliphatic epoxy resin and the reinforcement of E-type glass fibre. Comparing the stiffness values of the tested pairs of disk springs as indicatd by the slopes of curves 20 and 21, it can be seen that the stiffness of the pair of reinforced disk springs is not less than 50% greater than that of the pair according to the present state of the art. It should be noted that the possibilities of increasing stiffness have not yet been exhausted in the tests carried out so far.

To make the invention easier to understand, the known theory of the isotropic disk spring will be briefly described and its application to the anisotropic disk spring of the invention will be explained.

To deform an isotropic disk spring from its original open state to its compressed state, an axial force is exerted on the spring which performs work of deformation. The resistance offered by the disk spring is equivalent to the sum of all the elemental resistances to the individual elemental deformations brought about when the disk spring is compressed. Such deformation consists of tangential and radial elongation in the lower part of the spring, tangential and radial contraction in the upper part of the spring and displacement relative to one another of coaxial tubular elements. When deformation of these kinds arises, stresses occur in the disk spring which, according to the various types of deformation, are: tangential and radial tensile stresses in the lower part of the spring; tangential and radial compressive stresses in the upper part of the spring;

and axial shear stresses at cylindrical surfaces of tubular elements of the spring. For isotropic materials which obey Hooke's law, the following relationships are applicable:

$$\sigma = E\epsilon, A_\sigma = \sigma 2/E, \tau = \gamma G, A_\tau = \tau 2/G$$

where $\epsilon$ is elongation, $\sigma$ is normal stress, $E$ is the modulus of elasticity, $A_\sigma$ is the work of deformation of the normal stresses, $\gamma$ is the angular rotation, $\tau$ is shear stress, $G$ is modulus of shear and $A_\tau$ is the work of deformation of the shear stresses.

The tensile and compressive stresses $\sigma$ produced when the disk spring is compressed are thus proportional to the modulus of elasticity $E$ and the shear stresses $\tau$ are proportional to the modulus of shear $G$. From this it can be inferred that a disk spring of a material having a high $E$ and $G$ modulus requires a greater expenditure of force, and hence more work of deformation, to compress it than a disk spring of a material with a low $E$ and $G$ modulus. Thus, in order to achieve high stiffness, the isotropic disk spring should be of a tough material with a high $E$ and $G$ modulus.

The isotropic disk spring is, of course, subject to the constraint that no plastic deformation must take place under conditions of maximum height reduction, i.e., the stresses and deformation caused must not exceed permissible values lying within the elastic region.

Figure 10:
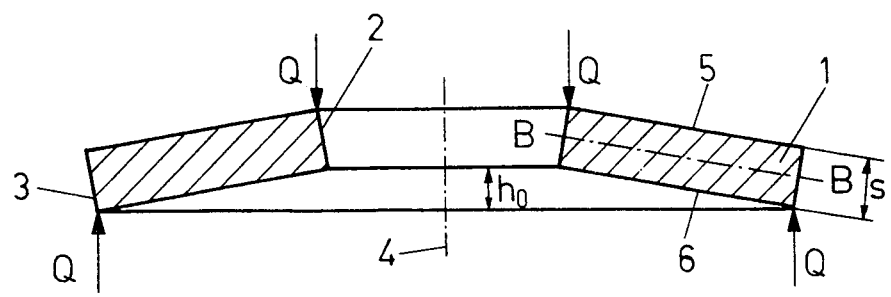
FIG. 10 shows a section through a disk spring composed of isotropic material of rectangular cross-section and loaded in the conventional manner; and, FIG. 11 illustrates the calculated tangential stresses along the radial width of the isotropic disk spring shown in FIG. 10.
Figure 11:
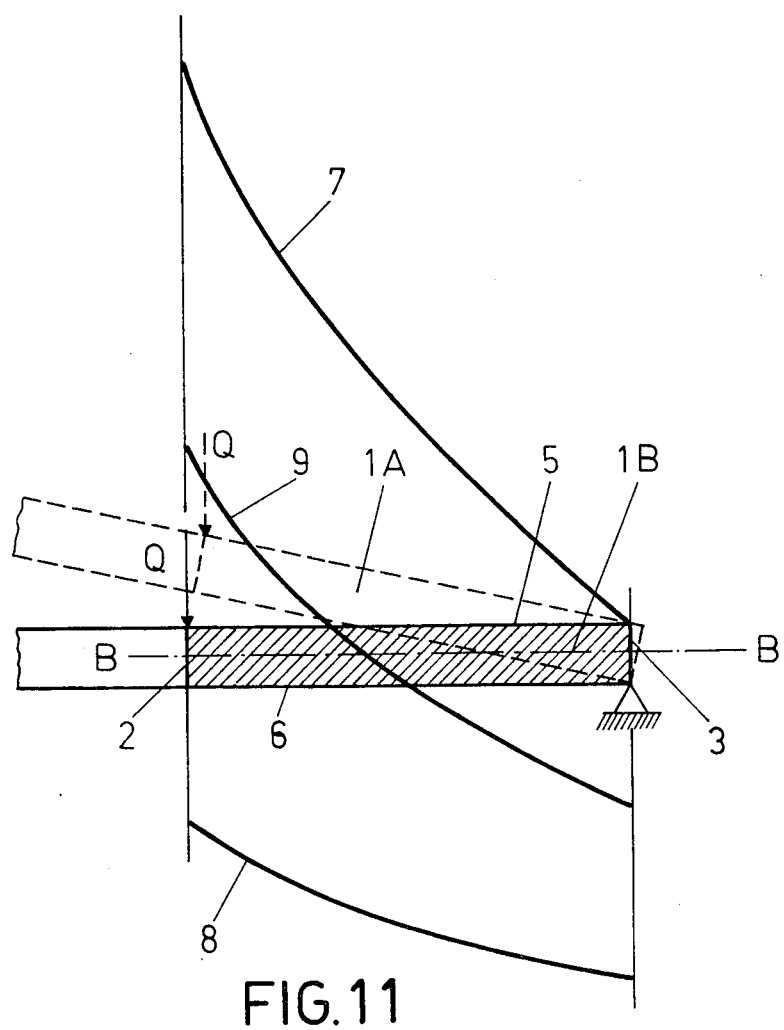

An isotropic disk spring of the kind described above is shown in FIG. 10. This is an ordinary Belleville spring comprising a conical shell 1 of rectangular cross-section. The load Q uniformly distributed over the circumference of the inner and outer edge of the disk spring tends to flatten the spring, i.e., the free height $h_o$ is reduced to a value $h$ (not shown). The difference $h_o - h = f$ is thus its axial deflection. The tangential stresses occurring in the various parts of the disk spring when it is depressed are shown in FIG. 11, which has been taken from the literature noted earlier, by J. O. Almen and A. Laszlo. These tangential stresses can be calculated with the relationships stated in literature a) by Siegfried Gross.

The diagram of FIG. 11 shows in qualitative terms the distribution of the tangential stresses in the radial direction in an isotropic disk spring which occur when the spring is deformed from its unloaded state 1A to the loaded, flattened state 1B. Curve 7 relates to the upper surface 5, curve 8 to the undersurface 6 and curve 9 to the mean surface B—B of the spring.

From FIG. 11, it may be seen:

a. that the tangential stresses occurring at the upper surface 5 of the spring are compressive stresses, the maximum value of which occurs at the edge of the bore 2;

b. that the tangential stresses occurring at the undersurface 6 of the spring are tensile stresses, the maximum value of which occurs at the edge of the bounding surface 3;

c. that the tangential stresses occurring on the mean surface B—B of the disk spring in the region of the bore 2 are compressive stresses, the maximum value of which occurs at the bore 2, whereas in the outer region they are tensile stresses, the maximum value of which occurs at the bounding surface 3; and d. that the greatest of all tangential stresses, which occurs on the upper surface 5 at the edge of the bore 2, is a compressive stress and is the only one which in almost all practical cases must be taken into account when designing isotropic metallic disk springs.

The radial tensile and compressive stresses occurring in a loaded isotropic disk spring along its radial width also vary within relatively wide limits in a manner similar to the variation of the tangential stresses shown in FIG. 11. However, these limits are much lower than in the case of the tangential stresses. The values of the shear stresses are also relatively low and vary inversely with the radius, i.e., they increase along the radial width of the disk spring from the outside inwards.

The above statements with respect to isotropic metal springs are also applicable to non-reinforced disk springs of isotropic plastic material. However, it must not be forgotten that the elastic properties of plastics can deviate quite markedly from the characteristics of Hooke's law and that with many plastics there are major differences between tensile strength and compressive strength. When designing, therefore, consideration must be given not only of the tangential compressive stresses, as in the case of isotropic metal springs, but also of the tangential tensile stresses, the radial tensile and compressive stresses and the axial shear stresses.

If an anisotropic disk spring is to be made with a conical shell of plastic and is also to be of great stiffness, the above statements are applicable for the shell and can be referred to for considering the distribution of stresses in the shell. From the stress distribution, one can also infer qualitatively with respect to the distribution of the deformations, which in the case of materials conforming to Hooke's law, is directly proportional to the stresses, while with materials not conforming to Hooke's law, it varies directly although not proportionally. Since tangential deformation of the conical shell is by far the greatest, to improve the stiffness of a disk spring, it is most effective to increase it resistance to tangential deformation with the aid of reinforcing elements running in the circumferential direction. Of course, in an individual case, reinforcing elements running in the radial direction or in the direction of the generatrix can contribute significantly to increasing the stiffness. It should be noted that a loaded disk spring behaves roughly similar to a loaded beam, the deflection of which increases with the square of its length and varies inversely with its moment of inertia, i.e., with the fourth power of its height. A small, thick disk spring is thus much stiffer than a large thin one and the reinforcing elements are more effective the further they are from the "neutral" surface of the disk spring.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent is:

1. A reinforced disk spring comprising:
 a conical shell of elastically deformable material having an upper plane or convex surface, a lower concave surface, an outer bounding surface, and an inner bore; and
 a plurality of reinforcing elements embedded within said conical shell and disposed such that each of said elements is a three dimensional body of revolution and coaxial with the spring axis, said elements also being disposed throughout said shell in a radially extending array, whereby the reinforcing elements present directed resistance to specific deformations occurring when the spring is axially loaded.

2. A disk spring as claimed in claim 1 in which at least some of the reinforcing elements comprising at least one part of said spring have a shape at least approximating the shape of a body of rotation, the generatrix of which forms an angle with the axis of rotation of between 0° and 90°.

3. A disk spring as claimed in claim 1 in which the reinforcing elements are constructed so that the stresses occurring therein when the disk spring is fully depressed are within the elastic limit of the material of the reinforcing elements.

4. A disk spring as claimed in claim 1 in which the cross-sectional dimensions of the reinforcing elements vary in accordance with the resistance to be generated.

5. A disk spring as claimed in claim 1 in which at least some of the reinforcing elements comprises a foil-type material.

6. A disk spring as claimed in claim 1 in which at least some of the reinforcing elements comprise fibres in the form of individual fibres, twisted cords, woven structures or mats.

7. A disk spring as claimed in claim 6 in which the fibres run in the direction of the generatrix.

8. A disk spring as claimed in claim 2 in which the reinforcing elements comprise plane parts.

9. A disk spring as claimed in claim 2 in which the reinforcing elements comprise conically shaped parts.

10. A disk spring as claimed in claim 9 in which the direction of taper of the conically shaped parts is opposite to that of the direction of taper of the conical shell.

11. A disk spring as claimed in claim 9 in which the direction of taper of the conically shaped parts is the same as the direction of taper of the conical shell.

12. A disk spring as claimed in claim 11 in which the generatrices of the conical parts are parallel to the generatrices of the conical shell.

13. A disk spring as claimed in claim 1 in which the reinforcing elements are separate from each other.

14. A disk spring as claimed in claim 1 in which the reinforcing elements are in the form of continuous spirals or concentrically arranged ring-shaped loops.

15. A disk spring as claimed in claim 13 in which the reinforcing elements are in the form of continuous spirals or concentrically arranged ring-shaped loops.

16. A disk spring as claimed in claim 1 in which each reinforcing element is held fixed in the material of the conical shell so that when the disk spring is loaded the conical shell and the reinforcing element deform together without relative movement therebetween.

17. A disk spring as claimed in claim 16 in which at least some of the surfaces of at least some of the reinforcing elements in contact with the material on the conical shell are surface-treated in order to increase adhesion between the contact surfaces.

18. A disk spring as claimed in claim 1 in which at least some of the reinforcing elements incorporate hollow spaces into which the material of the conical shell penetrates in order preserve the continuity of the conical shell.

19. A disk spring as claimed in claim 1 in which the cross-section of the conical shell is at least approximately rectangular, trapezoidal or of another cross-section to obtain a desired force/spring deflection characteristic.

20. A disk spring as claimed in claim 1 in which the conical shell comprise electrically insulating materials.

21. A disk spring as claimed in claim 6 in which the conical shell comprise electrically insulating materials.

22. A disk spring as set forth in claim 1, wherein
the shape, dimensions, and material of said conical shell are such that a non-reinforced shell of the same characteristics as said reinforced disk spring will withstand a smaller load for a predetermined deformation or will deform a greater amount for a predetermined load.

23. A disk spring as set forth in claim 1, wherein the distances between adjacent reinforcing elements over the radial width vary in accordance with the resistance to be generated.

24. A disk spring as set forth in claim 1, wherein the distances between adjacent reinforcing elements over the thickness of said conical shell vary in accordance with the resistance to be generated.

25. A disk spring as set forth in claim 6, wherein the fibers run in the direction of the circumferential direction.

26. A disk spring as set forth in claim 2, wherein the reinforcing elements comprise cylindrical parts.

27. A disk spring as set forth in claim 1, wherein the reinforcing elements are joined to each other.

28. A disk spring as set forth in claim 1, wherein the reinforcing elements comprise electrically insulating materials.

29. A disk spring as set forth in claim 6, wherein thereinforcing elements comprise electrically insulating materials.

* * * * *